United States Patent [19]

Ellis et al.

[11] Patent Number: 4,572,533
[45] Date of Patent: Feb. 25, 1986

[54] WHEELCHAIR SHOCK ABSORBING APPARATUS

[76] Inventors: Laura Ellis, 230 A. W. Guadalupe, LaGrange, Tex. 78945; Joe M. Caram, 3106 Aberdeen, Houston, Tex. 77025; John R. Cantu, 502 McDougal, San Antonio, Tex. 78223; Troy W. Dudley, P.O. Box 6, Haslet, Tex. 76052; Mitchell A. Callahan, 2215 Silver Holly La., Richardson, Tex. 75081

[21] Appl. No.: 614,776

[22] Filed: May 29, 1984

[51] Int. Cl.[4] .............................................. A61G 5/02
[52] U.S. Cl. ............................... 280/242 WC; 16/44; 280/670; 297/DIG. 4
[58] Field of Search ............... 280/242 WC, 211, 670, 280/277, 285, 286; 301/133; 16/44; 297/DIG. 4

[56] References Cited

U.S. PATENT DOCUMENTS

| 664,052 | 12/1900 | Lawry | 16/44 X |
|---|---|---|---|
| 1,249,616 | 12/1917 | Grabill | 280/670 |
| 3,282,605 | 11/1966 | Nihlean | 280/211 |
| 3,337,230 | 8/1967 | Golding | 16/44 X |
| 4,436,320 | 3/1984 | Brudermann | 280/242 WC |

FOREIGN PATENT DOCUMENTS

| 329826 | 5/1930 | United Kingdom | 301/133 |
|---|---|---|---|
| 640765 | 7/1950 | United Kingdom | 280/242 WC |

Primary Examiner—John A. Pekar
Attorney, Agent, or Firm—Bill B. Berryhill

[57] ABSTRACT

Shock absorbing apparatus for use on a wheelchair of the type having a frame mounted on a pair of front wheels and a pair of rear wheels in which the front wheels and/or back wheels are provided with shock mounting assemblies. The shock mounting assemblies include one or more spring assemblies attached to the frame to cushion shock on the respective wheel.

16 Claims, 4 Drawing Figures

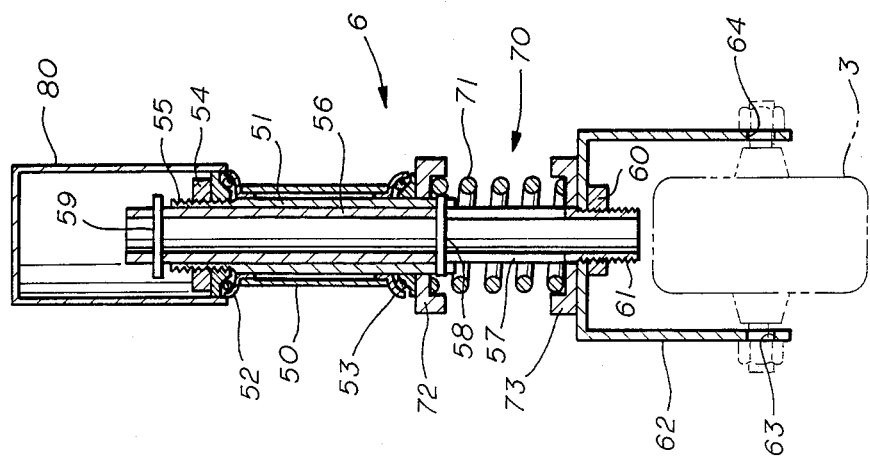
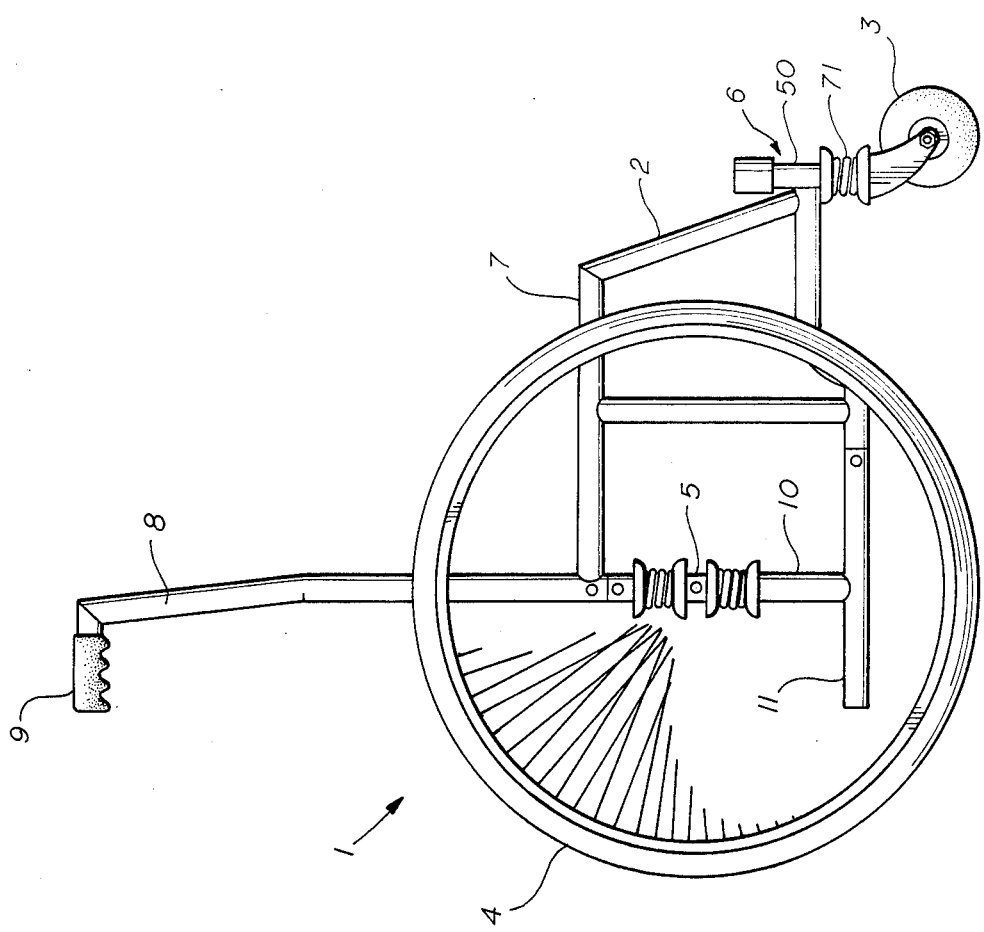

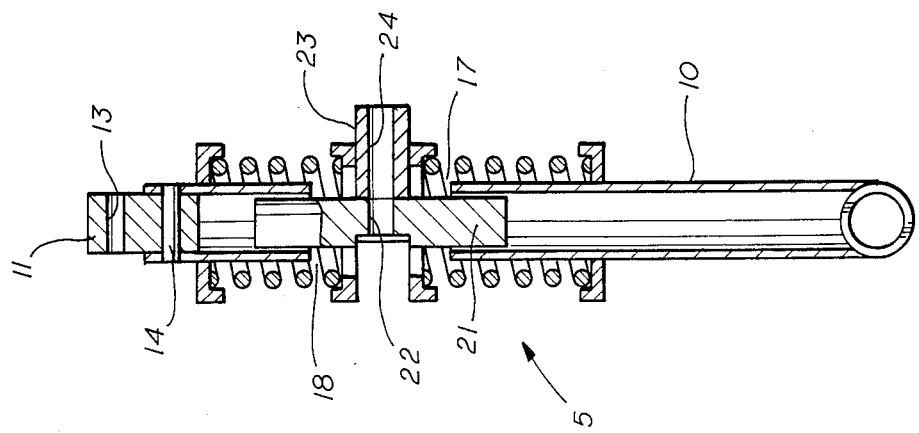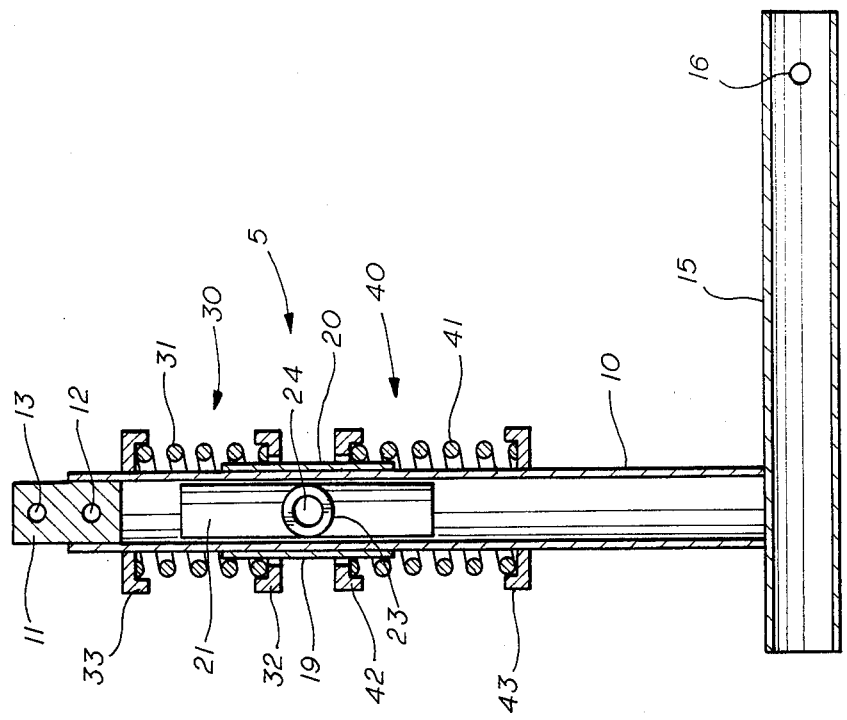

WHEELCHAIR SHOCK ABSORBING APPARATUS

BACKGROUND OF THE INVENTION

1. Field of the Invention

The present invention pertains to wheelchairs of the type having a frame mounted on a pair of front and rear wheels. Specifically, the present invention pertains to an improved wheelchair in which the pair of front wheels and/or the pair of rear wheels are provided with shock absorbing assemblies.

2. Description of the Prior Art

Wheelchairs have, of course, been in existence for many years. Most wheelchairs comprise a frame which is mounted on a pair of front and rear wheels. The rear wheels are normally mounted on fixed axles and the front wheels, in many cases, are mounted for swiveling about a vertical pivot so that the wheelchair may be turned or guided in the proper direction. Of course, the frame normally carries a chair or seat on which the occupant of the wheelchair sits.

Wheelchairs are normally used on relatively smooth surfaces and at slow speeds. Wheelchairs on which the wheels are mounted directly to the frame, without any suspension or shock assembly, may subject the user to sudden shocks and jolts if the wheels encounter an obstruction such as a rut or a hole. This, of course, is quite uncomfortable, particularly to those suffering from recent surgery or medical treatment. In an effort to reduce the rider's discomfort, a number of wheelchair designs have evolved which provide some sort of cushioning or shock absorption, particularly for the rear wheels. Examples of such may be seen in U.S. Pat. Nos. 1,123,872; 3,282,605; 3,917,312; 4,078,817; and 4,190,263; and British Pat. No. 640,765.

While a number of attempts have been made to improve the wheelchair by providing shock absorption, most designs are not adaptable to the various types of wheelchair frames. Some are relatively bulky and too complex for routine use while others are far too expensive. Thus, the search continues for a better wheelchair design which will provide the occupant with a smoother, more comfortable ride.

SUMMARY OF THE INVENTION

The present invention provides means to improve a wheelchair of the type having a frame mounted on a pair of front and rear wheels in which the rear wheels and/or the front wheels are provided with shock absorbers to cushion shocks thereon. The shock mounting means disclosed for the rear wheels may include a vertical tubular member which forms a portion of the frame and has an elongated slot in the walls thereof, a slide bar coaxially disposed within the tubular member, a wheel attachment member attached to the slide bar and projecting perpendicularly therefrom through the slot for attachment of one of the rear wheels thereto, and one or more spring assemblies carried by the tubular member adjacent to the wheel attachment member to cushion shock on the rear wheel. Shock mounting means for the front wheel may include a vertical tubular member forming a portion of the frame, a tubular sleeve member coaxially disposed within the tubular member for rotation relative thereto, a cylindrical support member coaxially disposed within the sleeve member for non-rotating and limited axial movement therein, a wheel mounting member attached to one end of the cylindrical support member and by which the front wheel is attached to the shock mounting assembly, and a spring assembly carried by the cylindrical support adjacent to the wheel mounting member to cushion shock on the front wheel.

Thus, the improved wheelchair of the present invention will provide shock mounting for the pair of rear wheels and/or the pair of front wheels so as to cushion or absorb shocks which would otherwise be transmitted from the wheels to the user of the wheelchair. The shock mounting assemblies of the present invention are relatively simple and inexpensive, yet very effective. In addition, the shock mounting assemblies of the present invention are easily adaptable to most wheelchair frames. The additional objectives and advantages of this invention will be understood by reading the description which follows in conjunction with the accompanying drawings.

BRIEF DESCRIPTION OF THE DRAWINGS

FIG. 1 is a side elevation view of an improved wheelchair according to a preferred embodiment of the invention;

FIG. 2 is an elevation view, partially in section, of a rear wheel shock mounting assembly for the wheelchair of FIG. 1, according to a preferred embodiment thereof;

FIG. 3 is an elevation view, partially in section, of the shock mounting assembly of FIG. 2 rotated 90° about the vertical axis thereof; and FIG. 4 is an elevation view, in section, of a front wheel shock mounting assembly of the improved wheelchair of FIG. 1.

DESCRIPTION OF THE PREFERRED EMBODIMENT

Referring first to FIG. 1, the improved wheelchair 1 of the present invention comprises a frame 2 mounted on a pair of front wheels 3 and a pair of rear wheels 4. A portion of the rear wheel 4 is broken away to show a shock mounting assembly 5 by which the rear wheels 4 are attached to the frame 2. The shock mounting assembly 5 will be described in greater detail hereafter with reference to FIGS. 2 and 3. The front wheels 3 are attached to the frame 2 by shock mounting assemblies 6 which will be described hereinafter with reference to FIG. 4. The frame 2 normally has a seating area 7 and a back 8 by which the user is supported. Handles 9 may be provided as an extension of the back 8 so that an attendant may help propel the wheelchair 1.

Referring now to FIGS. 2 and 3, the rear shock mounting assembly 5 includes a vertical tubular member 10 which actually forms a portion of the frame 2 of the wheelchair. The vertical tubular member 10 may be attached to an adjoining tubular portion of the wheelchair frame by a cylindrical adapter 11 which fits snugly within the tubular member 10 and the adjoining tubular portion of the frame (not shown in FIGS. 2 or 3). The cylindrical adapter 11 may be provided with transverse holes 12 and 13 to receive an attachment pin such as the one 14 shown in FIG. 3. The vertical tubular member 10 may be attached at its lower end by welding it to the horizontal tubular member 15 which also forms a portion of the wheelchair frame 2. The horizontal portion 15 may be attached to the frame in the same manner as the vertical member 10 by providing an adapter, such as adapter 11, and a hole 16 through which a pin may be inserted to hold the adapter in place.

The vertical tubular member 10 is provided with elongated vertical slots 17 and 18 through the walls thereof and on opposite sides thereof. Reenforcing plates 19 and 20 may be welded to the vertical tubular member 10 between slots 17 and 18 to compensate for the loss of strength by the removal of the walls in the slotted areas 17 and 18. A cylindrical slide bar 21 is coaxially disposed within the tubular member 10 for limited axial movement therein. A counterbored hole 22 is drilled transversely through the slide bar 21 to receive a bolt by which a wheel attachment member 23 may be joined to the slide bar 21. The bolt (not shown) may also serve as the axle for the rear wheel 4.

The wheel attachment member 23 is preferably cylindrical, projecting perpendicularly from the slide bar 21 and contains a hole 24 which corresponds with the counterbored hole 22 of the slide bar 21. The end of the wheel attachment member 23 which is joined to the slide bar 21 is machined to provide a snug fit against the cylindrical exterior of the slide bar 21. It should be understood that the bolt (not shown) which engages the holes 22 and 24 of the slide bar 21 and the wheel attachment member 23 also serves as an axle and support for the rear wheel 4.

The first spring assembly 30 is carried by the tubular member 10 above the wheel attachment member 23 and a second spring assembly 40 is carried by the tubular member 10 below the wheel attachment member 24. The first spring assembly 30 is intended to cushion upward shock on the rear wheel and the second spring assembly 40 is intended to cushion downward shock thereon.

Each of the spring assemblies 30 and 40 comprises a helically wound spring 31, 41, surrounding a portion of the tubular member 10, the ends of which are confined between a pair of annular spring retainer members 32, 33 and 42, 43. The annular spring retainer members 33 and 43 of the spring assemblies 30 and 40 which are the farthest from the wheel attachment member 23 are fixed to the tubular member 10. The other spring retainer members 32 and 42 are engaged by the wheel attachment member 23 to axially compress the respective spring member 31, 41, depending on the direction of the shock applied to the rear wheel 4, to absorb the rear wheel shock.

Referring now to FIG. 4, the front wheel shock assembly 6 will be described. The front wheel shock assembly 6 includes a vertical tubular member 50 which also forms a portion of the frame 2 as shown in FIG. 1. The tubular member 50 may be attached to the frame 2 by welding or any other suitable means. A tubular sleeve member 51 is coaxially disposed within the vertical tubular member 50 for rotation relative thereto. Rotation may be aided by the disposition of a pair of bearing assemblies 52 and 53 between the tubular member 50 and the sleeve member 51. The bearing assemblies may be held in place by a jam nut 54 threaded onto a threaded portion 55 of sleeve member 51.

A cylindrical support member 56 is coaxially disposed within the sleeve member 51. The cylindrical support member 56 is provided with elongated slots 57 near the lower end thereof through which a guide pin 58, supported at both ends in holes provided in sleeve member 51, passes to prevent relative rotation of the support member 56 and the sleeve member 51. However, since the pin 58 may travel up and down the slots 57, limited axial movement of the cylindrical support member 56 is permitted. Another pin 59 supported at opposite ends by holes provided in the upper portion of the support member 56 limits downward movement of the support member 56 by engagement with the upper end of the sleeve member 51.

Attached to the lower end of the cylindrical support member 56 by a nut 60 which engages a threaded portion 61 of the cylindrical support member 56, is an inverted U-shaped wheel mounting member 62. Holes 63 and 64 therein provide support for the axle of the wheel 3.

A spring assembly 70 is carried by the cylindrical support member 56 adjacent to the wheel mounting member 62 to cushion shock on the front wheel 3. The spring assembly 70 comprises a helically wound spring 71 which surrounds a cylindrical support member 56, the ends of which are confined between a pair of annular spring retainer members 72 and 73. One of the annular spring retainer members 73 engages the wheel mounting member 62, and the other retainer member engages the tubular sleeve member 56. It can be easily understood that a shock on the front wheels 3 in either the upward or downward direction will cause the spring 71 to be compressed, absorbing the shock thereof.

The upper portion of the front wheel shock assembly 6 is enclosed by a cap 80 to protect the inner workings from the external environment. It also prevents clothing of the wheelchair occupant from becoming entangled therein.

Thus, the improved wheelchair of the present invention will improve the wheelchair by providing shock absorption capability for the rear and/or front wheels. The production of these assemblies will be relatively simple and inexpensive, utilizing components which are readily available or manufacturable. Most importantly, the shock mounting assemblies of the present invention are extremely effective in cushioning wheel shock on wheelchairs, providing a much more comfortable ride for the occupant thereof.

While preferred embodiments of the invention have been described herein, many variations could be made without departing from the spirit of the invention. Accordingly, it is intended that the scope of the invention be limited only by the claims which follow.

We claim:

1. Shock absorbing apparatus for use on a wheelchair of the type having a frame mounted on a pair of front wheels and a pair or rear wheels wherein said shock absorbing apparatus comprises shock mounting means on each of at least one of said pair of wheels comprising:
  a vertical tubular member forming a portion of said frame and having an elongated slot in the walls thereof;
  a slide bar slidingly disposed within said tubular member;
  wheel attachment means attached to said slide bar and projecting perpendicularly therefrom through said slot for attachment of one of said wheels thereto;
  first spring assembly carried by said tubular member above said wheel attachment means to cushion upward shock on said wheel; and
  second spring assembly carried by said tubular member below said wheel attachment means to cushion downward shock on said wheel;
  each of said first and second spring assemblies comprising a helically wound spring surrounding a portion of said tubular member and the ends of which are confined between a pair of annular spring retainer members.

2. Shock absorbing apparatus as set forth in claim 1 in which the one of said annular spring retainer members farthest from said wheel attachment means is fixed to said tubular member and the other of which is engageable by said wheel attachment means and axially movable on said tubular member to compress said spring and to absorb said shock on said rear wheel.

3. Shock absorbing apparatus as set forth in claim 1 including second shock mounting means for mounting each of said other pair of wheels on said frame for cushioning shock thereto.

4. Shock absorbing apparatus as set forth in claim 3 in which each of said second shock mounting means comprises:
   a vertical tubular member forming a portion of said frame;
   a tubular sleeve member coaxially disposed within said tubular member for rotation relative thereto;
   a cylindrical support member coaxially disposed within said sleeve member for non-rotating and limited axial movement therein;
   wheel mounting means attached to one end of said cylindrical support member and by which said wheel is attached to said second shock mounting assembly; and
   third spring assembly carried by said cylindrical support member adjacent said wheel mounting means to cushion shock on said wheel.

5. Shock absorbing apparatus as set forth in claim 4 in which said cylindrical support member is provided with an elongated slot transverse to the axis thereof through which a guide pin, attached at both ends to said sleeve member, passes said guide pin preventing relative rotation of said cylindrical support member but allowing said limited axial movement thereof.

6. Shock absorbing apparatus as set forth in claim 4 including bearing means disposed between said tubular member and said sleeve member and by which said sleeve member is rotatable within said tubular member.

7. Shock absorbing apparatus as set forth in claim 4 in which said third spring assembly comprises a helically wound spring surrounding said cylindrical support member and the ends of which are confined between a pair of annular spring retainer members, one of which engages said wheel mounting means and the other of which engages said tubular sleeve member.

8. Shock absorbing apparatus for use on a wheelchair of the type having a frame mounted on a pair of front wheels and a pair of rear wheels wherein said shock absorbing apparatus comprises shock mounting means for each of at least one of said pair of wheels comprising:
   a vertical tubular member forming a portion of said frame;
   a tubular sleeve member coaxially disposed within said tubular member for rotation relative thereto;
   a cylindrical support member coaxially disposed within said sleeve member for non-rotating and limited axial movement therein;
   wheel mounting means attached to one end of said cylindrical support member and by which said wheel is attached to said shock mounting assembly; and
   a spring assembly carried by said cylindrical support member adjacent said wheel mounting means to cushion shock on said wheel.

9. Shock absorbing apparatus as set forth in claim 8 in which said cylindrical support member is provided with an elongated slot transverse to the axis thereof through which a guide pin, attached at both ends to said sleeve member, passes, said guide pin preventing relative rotation of said cylindrical support member but allowing said limited axial movement thereof.

10. Shock absorbing apparatus as set forth in claim 8 including means disposed between said tubular member and said sleeve member and by which said sleeve member is rotatable within said tubular member.

11. Shock absorbing apparatus as set forth in claim 8 in which said spring assembly comprises a helically wound spring surrounding said cylindrical support member and the ends of which are confined between a pair of annular spring retainer member, one of which engages said wheel mounting means and the other of which engages said tubular sleeve member.

12. Shock absorbing apparatus as set forth in claim 8 including second shock mounting means for mounting each of said other pair of wheels on said frame for cushioning shock thereto.

13. Shock absorbing apparatus as set forth in claim 12 in which each of said second shock mounting means comprises:
   a vertical tubular member forming a portion of said frame and having an elongated slot in the walls thereof;
   a slide bar coaxially disposed within said tubular member for limited axial movement therein;
   wheel attachment means attached to said slide bar and projecting perpendicularly therefrom through said slot for attachment to one of said wheels thereto;
   second spring assembly carried by said tubular member above said wheel attachment means to cushion upward shock on said wheel; and
   third spring assembly carried by said tubular member below said wheel attachment means to cushion downward shock on said wheel.

14. Shock absorbing apparatus as set forth in claim 13 in which each of said second and third spring assemblies comprises a helically wound spring surrounding a portion of said tubular member and the ends of which are confined between a pair of annular spring retainer members.

15. Shock absorbing apparatus as set forth in claim 14 in which the one of said annular spring retainer members farthest from said wheel attachment means is fixed to said tubular member and the other of which is engageable by said wheel attachment means and to axially compress said spring to absorb said shock on said wheel.

16. Shock absorbing apparatus for use on a wheelchair of the type having a frame mounted on a pair of front wheels and a pair of rear wheels wherein the said shock absorbing apparatus comprises shock mounting means for each of said rear wheels and for each of said front wheels;
   each of said shock mounting means for said rear wheels including a vertical tubular member forming a portion of said frame and having an elongated slot in the walls thereof, a slide bar coaxially disposed within said tubular member for limited axial movement therein, wheel attachment means attached to said slide bar and projecting perpendicularly therefrom through said slot for attachment of one of said rear wheels thereto, first spring assembly carried by said tubular member above said wheel attachment means to cushion upward shock on said rear wheel, and second spring assembly carried by said tubular member below said wheel attachment means to cushion downward shock on said rear wheel;

each of said front wheel shock mounting means including a vertical tubular member forming a portion of said frame, a tubular sleeve member coaxially disposed within said tubular member for rotation relative thereto, a cylindrical support member coaxially disposed within said sleeve member for non-rotating and limited axial movement therein, wheel mounting means attached to one end of said cylindrical support member and by which said front wheel is attached to said front wheel shock mounting assembly, and third spring assembly carried by said cylindrical support member adjacent said wheel mounting means to cushion shock on said front wheel.

* * * * *